(No Model.) 3 Sheets—Sheet 1.

A. M. LANE.
MECHANICAL MOVEMENT.

No. 462,010. Patented Oct. 27, 1891.

Witnesses.
John Edwards Jr.
E. V. Tracy

Inventor,
Almeron M. Lane.
By James Shepard.
Atty.

(No Model.) 3 Sheets—Sheet 2.

A. M. LANE.
MECHANICAL MOVEMENT.

No. 462,010. Patented Oct. 27, 1891.

Witnesses
John Edwards Jr.
E. V. Tracy.

Inventor,
Almeron M. Lane
By James Shepard
Atty.

(No Model.) 3 Sheets—Sheet 3.

A. M. LANE.
MECHANICAL MOVEMENT.

No. 462,010. Patented Oct. 27, 1891.

Witnesses,
John Edwards Jr.
E. V. Tracy.

Inventor,
Almeron M. Lane,
By James Shepard,
Atty.

UNITED STATES PATENT OFFICE.

ALMERON M. LANE, OF MERIDEN, CONNECTICUT.

MECHANICAL MOVEMENT.

SPECIFICATION forming part of Letters Patent No. 462,010, dated October 27, 1891.

Application filed January 27, 1891. Serial No. 379,300. (No model.)

*To all whom it may concern:*

Be it known that I, ALMERON M. LANE, a citizen of the United States, residing at Meriden, in the county of New Haven and State of Connecticut, have invented certain new and useful Improvements in Mechanical Movements, of which the following is a specification.

My invention relates to improvements in a mechanical movement for converting reciprocating motion into an intermittent rotary motion; and the object of my improvement is increased efficiency, especially with reference to the accuracy of each intermittent movement.

Figure 1:
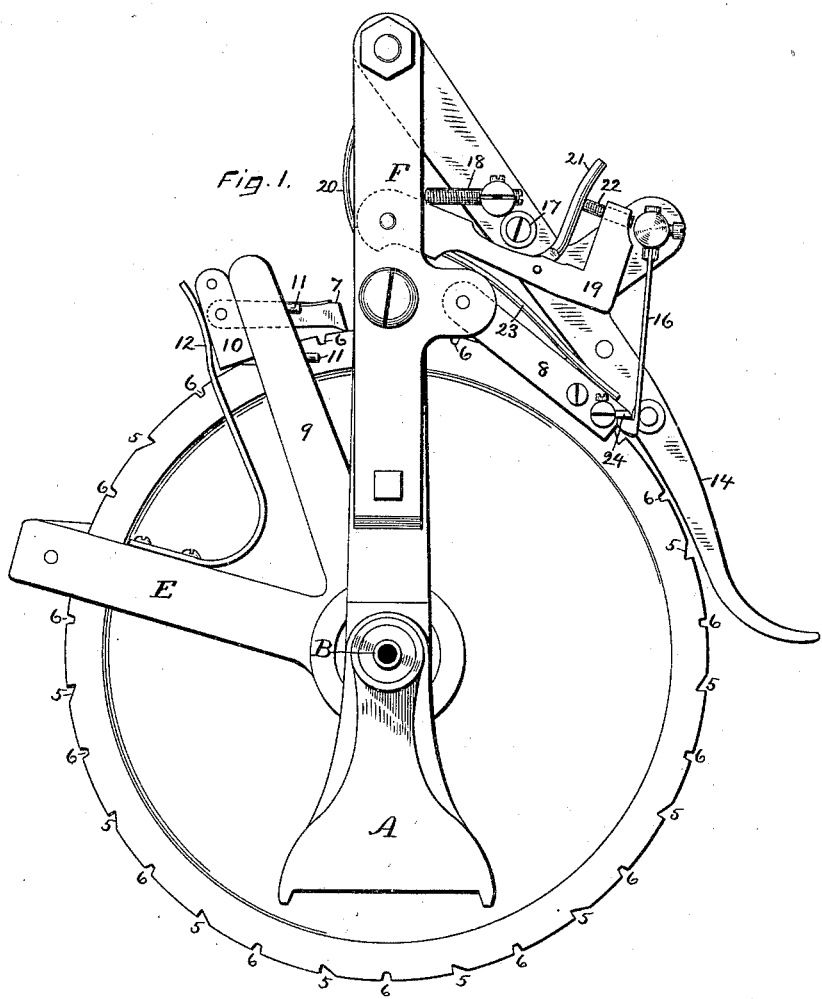
Figure 2:
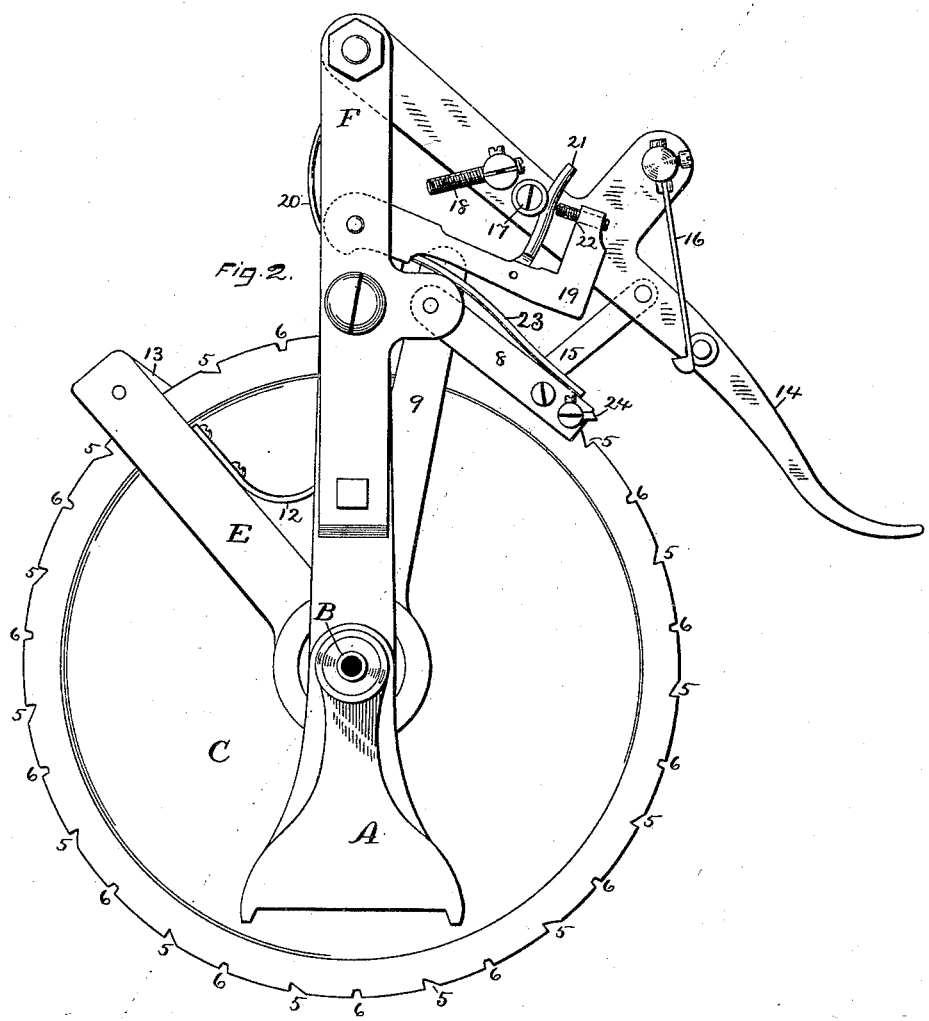
Figure 3:
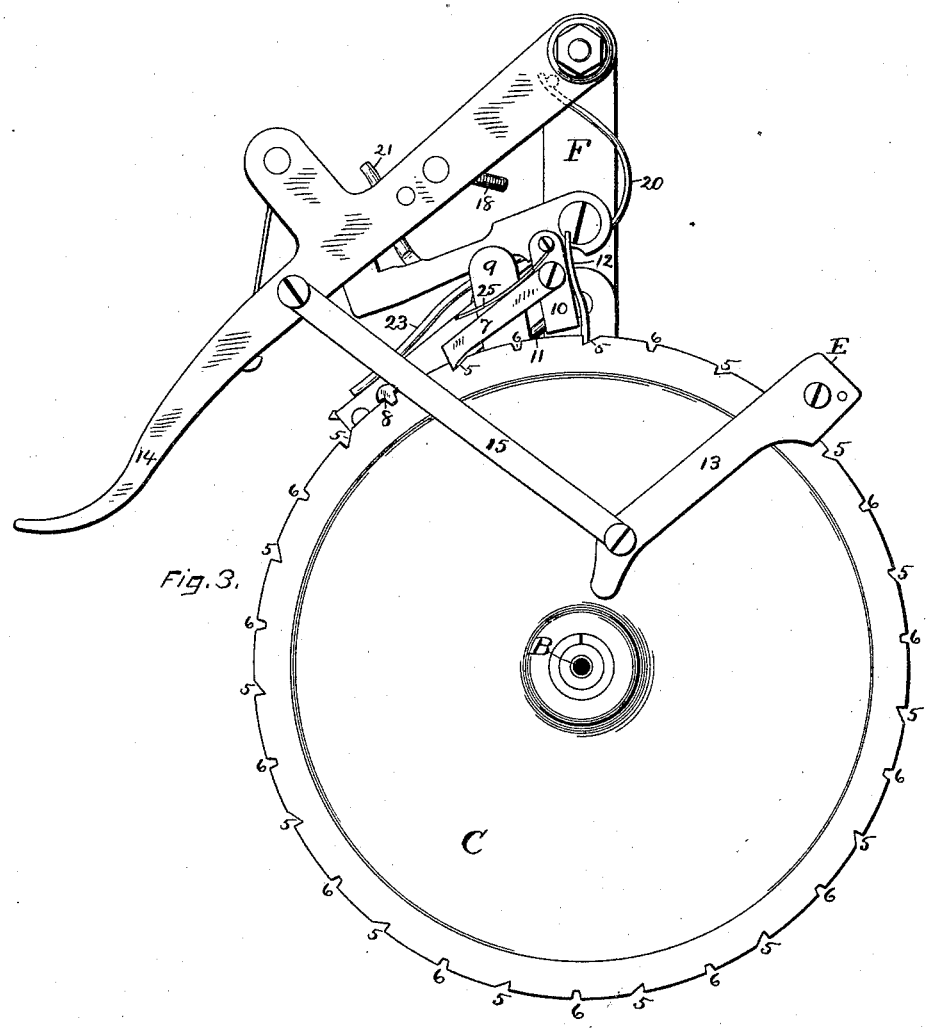
Figure 4:
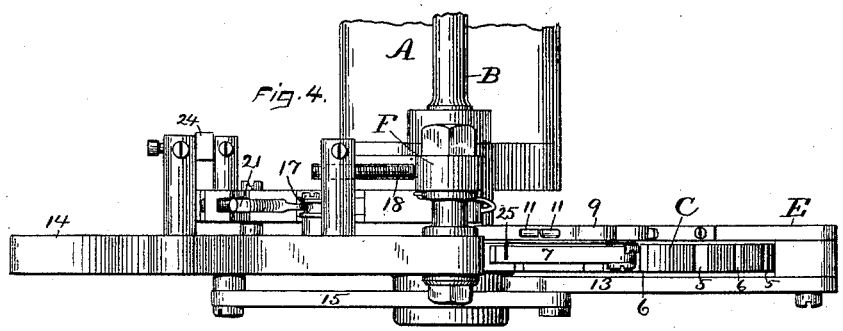

In the accompanying drawings, Figure 1 is a side elevation of my mechanical movement, with the parts at rest. Fig. 2 is a like view of the same with the actuating-lever lifted and the consequent change in the position of the other parts. Fig. 3 is a like view in the same position, but taken from the opposite side; and Fig. 4 is a plan view.

My movement may be used in various machines whenever it is desired to impart a positive and regular intermittent movement to a revolving shaft by the strokes of a reciprocating moving part—as, for instance, a press-slide. Such revolving shafts may be used for carrying an intermittently-revolving head that stops for the operation of different tools at different points—as, for instance, the intermittently-revolving head of screw-machines, drilling or milling machines, or for revolving a wheel or wheels and stopping them for the action of a saw or saws in gear-cutting engines and analogous work.

A designates a stand or frame for being attached to any desired machine, and B a shaft that is supported by said frame. Rigidly secured to one end of this shaft is a plate or disk C, having at its edge a series of ratchet or driving teeth 5 and a series of holding-teeth 6, the former being for enabling the disk to be driven by the pawl 7 and the latter for being engaged by the holding-detent 8. These two series of teeth may in many cases be formed on the edge of the same disk without interfering with each other; but in some work it may be desirable to form them on two separate disks both rigidly secured to the shaft, in which case one disk might be of a larger diameter than the other. Two separate disks, one bearing the ratchet-teeth and the other the holding-teeth, I consider the equivalent of a single disk having such two series of teeth, or one series of teeth might serve the double function of driving and holding teeth.

Loosely mounted upon the shaft B at a point inside the disk C is a swinging frame E, carrying a pawl-supporting arm 9, upon which is mounted a yielding pawl-carriage 10, to which the pawl 7 is pivoted. This carriage is supported in its sliding movement by means of rods 11 11, that pass through holes in the pawl-carrying arm 9. It is pressed upon by a spring 12 to hold it firmly against the arm 9, except when it is forced backward by a force greater than that of said spring. The spring, however, is heavy enough to move the disk C when its movement is unobstructed. The swinging frame E is provided with an arm 13, that extends toward the shaft B on that side of the disk which is opposite said frame.

An upright F is attached to and extended upward from the frame or support A. To the upper end of said upright is attached an actuating-lever 14, which moves with an oscillating or swinging reciprocating motion, and which may be actuated by a press-slide or other moving part of a machine to lift it for every motion thereof. A lifting-rod or other intermediate mechanism may of course be interposed between the actuating part of a machine and the lever 14, the nature of such intermediate mechanism being arranged through the expected skill of the mechanic in accordance with the machine to which my movement is attached. This lever is connected by means of a link 15 to the arm 13 of the frame E, as shown most clearly in Fig. 3. It is also provided with a spring-catch 16, a projection or roller 17, and a screw-adjustable stop 18 for contact with the upright F to limit its downward movement, as shown in Fig. 1. A holding-detent 8 is pivoted to the upright F, which detent rides upon the edge of the disk C. A pressing-lever 19 is also pivoted to the upright F and provided with a light spring 20 for forcing it downwardly. The holding-lever 19 is provided with an adjustable cam 21 for being acted upon by the roller 17, the same being adjusted to press with greater or less force against the roller by means of the screw 22. This holding-lever is provided with a stronger spring 23, that bears against the upper side of the detent 8. The detent 8 is provided with a shoulder or stud 24 for being engaged by the spring-catch 16. The pawl 7 is provided with a spring 25 for pressing it against the edge of the disk. When the lever 14 is dropped, the parts are in the position shown in Fig. 1. As the lever is raised, its first action is to raise the detent 8 out of its holding tooth or notch by the action of the spring-catch on the shoulder 24. The link 15, by the upward movement of said lever, causes the frame E to swing and carry the pawl 7 forward, which, engaging one of the ratchet-teeth, carries the disk C forward. At this time or at the beginning of the operation the detent is pressed against the edge of the disk only through the action of the lighter spring 20, because the holding-lever 19 is only held down through the medium of said spring. As the lever 14 approaches the end of its stroke and the holding-detent 8 is about to enter the succeeding holding-notch in the disk the adjustable cam 21 is acted upon by the roller 17 to press it toward the detent-lever and consequently to bring into action the stronger spring 23, and during the rest of the upward movement of said lever, and especially after the detent has engaged, the holding-lever presses it still more firmly into its holding-recess. As soon as the holding-detent falls into its holding-notch the disk remains stationary by reason of thus being firmly locked; but the lever 14 and swinging frame E, and consequently the pawl-carrier arm, may still move farther onward, the spring 12 yielding and permitting the pawl-carrying arm to move along on the pins 11, and thereby separate the pawl-carriage from said arm, as shown in Fig. 3, until the lever 14 has completed its stroke. The movement of the actuating part of the machine that lifts the lever 14 may vary at times by the slipping of the belt or other cause, and this yielding of the pawl and pawl-carriage on its holding-arm permits this variation in stroke to take place after the holding-detent has locked the disk, so that the yielding of the arm and pawl-carriage may vary and separate them more or less, accordingly as the stroke of the machine varies, but without causing any variation in the movement of the disk and its shaft. Upon the release of the arm 14 it is returned by the force of gravity, aided by springs, if desired. The parts return to their former position, as shown in Fig. 1, the spring-catch 16 snapping into engagement with the shoulder, ready to repeat the operation before described at the next upward movement of the lever 14.

I claim as my invention—

1. The combination of a disk provided with a series of holding and driving teeth, a detent 8 for engaging said holding-teeth, a pawl and yielding carrier for engaging the driving-teeth, a lifting-lever for operating the pawl-carrying arm, and mechanism for first releasing and then locking said detent, substantially as described, and for the purpose specified.

2. The combination of the disk C, having driving-teeth, the swinging pawl-carrying arm 9, the pawl-carriage yieldingly mounted thereon, and mechanism for oscillating said pawl-carrying arm, substantially as described, and for the purpose specified.

3. The combination of a disk, the detent 8, having a shoulder 24, the holding-lever 19, the lighter and stronger springs 20 and 23, the lifting-lever 14, lifting-catch 16, cam 21, and roller or projection on said lever for acting upon the cam of the holding-lever, substantially as described, and for the purpose specified.

4. The combination of the lever 14, having the roller or projection 17, the holding-lever 19, the swinging cam 21, and its adjusting-screw 22, substantially as described, and for the purpose specified.

5. A swinging pawl-carrying arm, a pawl carried forward thereby and having a yielding movement in a direction the reverse of its forward movement on said arm and independent of the swinging movement of said arm, substantially as described, and for the purpose specified.

6. A disk having driving-teeth, a swinging pawl-carrying arm mounted to oscillate about the axis of said disk, and a pawl-carriage yieldingly mounted on said arm, substantially as described, and for the purpose specified.

7. A disk having holding-teeth, a holding-detent for engaging said teeth, mechanism for moving said disk forwardly, a lever for operating said mechanism, and a device mounted on and carried by said lever for successively engaging and disengaging said holding-detent by withdrawing it during the first part of the movement of said lever in moving forward said disk and then dropping said holding-detent to permit it to rest upon the edge of the disk during the same movement of said lever, substantially as described, and for the purpose specified.

8. A disk having holding-teeth, a holding-detent for engaging said teeth, mechanism for moving said disk forwardly, a lever for successively engaging and disengaging said holding-detent to withdraw and drop it, and mechanism operated by said lever for firmly pressing said holding-detent against the edge of said disk after said withdrawal and dropping, substantially as described, and for the purpose specified.

ALMERON M. LANE.

Witnesses:
JAMES SHEPARD,
JOHN EDWARDS, Jr.